E. F. RITTER.
POT COVER.
APPLICATION FILED SEPT. 23, 1921.
1,436,606.
Patented Nov. 21, 1922.
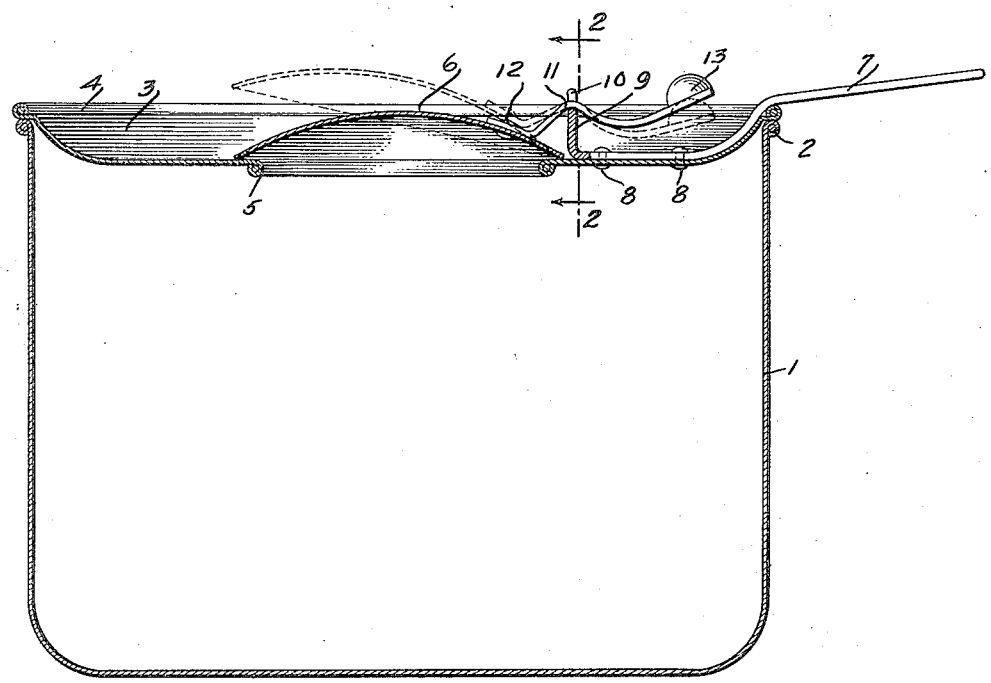
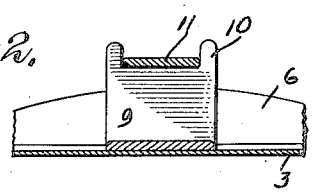
WITNESSES
INVENTOR
E. F. RITTER
BY
ATTORNEYS Patented Nov. 21, 1922.

1,436,606

UNITED STATES PATENT OFFICE.

EMIL F. RITTER, OF SOMERVILLE, NEW JERSEY.

POT COVER.

Application filed September 23, 1921. Serial No. 502,718.

*To all whom it may concern:*

Be it known that I, EMIL F. RITTER, a citizen of the United States, and a resident of Somerville, in the county of Somerset and State of New Jersey, have invented a new and Improved Pot Cover, of which the following is a full, clear, and exact description.

This invention relates to improvements in pot covers, an object of the invention being to provide an improved form of cover which will prevent a pot from boiling over with the inconvenient consequences of losing part of the material which is being cooked in the pot and soiling the stove.

A further object is to provide a pot cover which will be simple and practical in construction, durable and efficient in use, which may be easily cleaned, and which will be comparatively inexpensive to manufacture.

With these and other objects in view, the invention consists of certain novel features of construction and combinations and arrangements of parts as will be more fully hereinafter described and pointed out in the appended claims.

In the accompanying drawings:

Figure 1 is a view in transverse section through a pot showing my improved cover in applied position; and Figure 2 is a sectional detail view on the line 2—2 of Figure 1.

Referring in detail to the drawings, 1 represents a conventional form of open topped pot or other cooking utensil provided with a beaded edge 2, around its open upper end. 3 represents my improved pot cover, also having a beaded edge indicated at 4, which rests upon the beaded edge 2 of the pot.

The cover 3 is concave and slopes to a central opening 5. The opening 5 is normally closed by a closure preferably consisting of a convexly bowed circular cover plate 6. The invention in this case resides partially in the novel manner in which the closure or cover plate 6 is supported upon the cover 3.

Referring more specifically to this mounting, a handle member 7 is secured to the cover 3 by rivets or similar securing devices, indicated at 8. The handle member terminates adjacent the opening 5 in an upstanding extension in the form of a bracket 9. Upwardly projecting ears or lugs 10 are integral with opposite sides of the upper edge of the bracket 9.

A lever 11 of general compound curvature is connected to the cover plate 6 by means of a securing device such as a rivet 12. The lever rests upon and fulcrums on the bracket 9, the lugs 10 preventing lateral movement of the lever. At the end opposite to its point of attachment to the cover plate 6, the lever carries a counter-balancing weight 13.

The operation of the cover is as follows: The weight of the cover plate 6 normally preponderates over the weight of the counter-balance 13. This preponderation is very slight however, so that when material in the pot 1 starts to boil over, the pressure from within the pot will lift the cover plate without difficulty, exposing the contents of the pot to the air and allowing the pot to boil over onto the cover 3. The contents which boils over onto the cover will quickly drain back into the pot through the hole 5 so that there will be no danger of losing any of said contents which is being boiled or of staining a stove by the same boiling entirely over the cover.

The cover may be formed of any approved material and may be very easily cleaned by simply lifting the lever 11 and its associated parts off of the cover and washing the two parts of the cover separately.

Although I have illustrated one of the preferred embodiments of my invention, it will be apparent that various slight changes and alterations might be made in the general form and arrangements of the parts described without departing form the invention and hence I do not wish to limit myself to the precise details of construction, but shall consider myself at liberty to make such slight changes and alterations as fairly fall within the spirit and scope of the appended claims.

I claim:

1. A concave pot cover having a central opening therein, an outwardly opening closure pivoted to the cover over the opening, and a counterbalancing weight attached to the closure, the said closure normally overbalancing the counterbalance weight to hold said closure in closed relation over the opening.

2. A cover for cooking utensils comprising a dish-shaped cover member having an opening in the bottom thereof, an outwardly opening closure pivoted to the cover member and adapted to normally gravitationally cover said opening, and means provided on the closure for counterbalancing the same whereby to cause the opening of the closure by internal pressure to admit of the reduction of the pressure before the same is sufficient to lift the cover.

3. A cover for cooking utensils embodying a dish-shaped lid adapted to be mounted over the upper open end of the utensil, said lid having an opening in the bottom thereof, an outwardly opening closure for said opening normally closed by gravity, and a counterbalancing means on the closure whereby to cause the opening of the closure by internal pressure prior to the lifting of the lid from the utensil, said dish-shaped lid constituting a receptacle for effecting the subsequent draining of the ejected contents back into the utensil through the opening.

4. A pot cover having an opening therein, a handle member secured to the cover and terminating in an upstanding bracket adjacent the opening, a lever fulcrumed between its ends on the bracket, a cover plate constituting a closure for the opening carried by one end of the lever, and a counterbalance weight carried by the other end of the lever, said bracket having upstanding lugs preventing lateral sliding movement of the lever.

EMIL F. RITTER.